(12) United States Patent
Battagin et al.

(10) Patent No.: US 8,429,118 B2
(45) Date of Patent: Apr. 23, 2013

(54) EMBEDDING AND RETRIEVING DATA IN AN APPLICATION FILE FORMAT

(75) Inventors: Daniel C. Battagin, Bellevue, WA (US); Gabhan Berry, Carnation, WA (US); Robert C. Collie, Cleveland, OH (US); Lee B. Graber, Kirland, WA (US); Raman S. Iyer, Redmond, WA (US); Shahar Prish, Redmond, WA (US); Su-Piao Bill Wu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 360 days.

(21) Appl. No.: 12/605,126

(22) Filed: Oct. 23, 2009

(65) Prior Publication Data

US 2011/0099143 A1  Apr. 28, 2011

(51) Int. Cl.
*G06F 7/00* (2006.01)

(52) U.S. Cl.
USPC .......... 707/602; 707/726; 707/776; 709/201; 709/202; 709/227

(58) Field of Classification Search ........... 707/602, 707/726, 776; 709/227, 201, 202
See application file for complete search history.

(56) References Cited

U.S. PATENT DOCUMENTS

| 6,789,255 | B1 * | 9/2004 | Pedrizetti et al. | 717/169 |
| 7,017,112 | B2 | 3/2006 | Collie et al. | 715/212 |
| 2005/0091231 | A1 | 4/2005 | Pal et al. | 707/100 |
| 2005/0278307 | A1 * | 12/2005 | Battagin et al. | 707/3 |
| 2006/0136433 | A1 | 6/2006 | Rothschiller et al. | 707/100 |
| 2007/0022128 | A1 * | 1/2007 | Rothschiller et al. | 707/100 |
| 2007/0204019 | A1 * | 8/2007 | Martynov et al. | 709/223 |
| 2008/0021932 | A1 * | 1/2008 | Patterson et al. | 707/200 |
| 2009/0271499 | A1 * | 10/2009 | Reisman | 709/219 |

OTHER PUBLICATIONS

"Mastering the SAP Business Information Warehouse" McDonald et al., Wiley publishing, Inc. Sep. 12, 2007.*
Rodriguez, S.; "*Custom XML? What Custom XML?*"; OOXML is defective by design; Mar. 2008; 5 pgs.
MSDN; "*Custom XML Parts Overview*"; Microsoft Visual Studio Tools for the Microsoft Office System (ver. 3.0); Aug. 2008; 3 pgs.
TechRepublic: A ZDNet Tech Community/CBS Interactive; "*Store and retrieved XML data with custom Java classes in Sybase*"; Jul. 10, 2002; 5 pgs.
MSDN; "*Walkthrough; Connect an Item in the Data Store to an Excel Workbook*"; 2009 Microsoft Corporation, accessed via http://msdn.microsoft.com/en-us/library/bb243827.aspx on Oct. 13, 2009; 2 pgs.

* cited by examiner

*Primary Examiner* — Cindy Nguyen
(74) *Attorney, Agent, or Firm* — Merchant & Gould

(57) ABSTRACT

Third party data embedding may be provided. Data associated with a third party provider may be saved in a native application save file. If a save file opened by the application is determined to comprise third party data, the application may determine whether an appropriate data provider is available. The application may connect to the data provider and provide on-demand, asynchronous access to the third party data upon request from a user.

19 Claims, 4 Drawing Sheets

EMBEDDING AND RETRIEVING DATA IN AN APPLICATION FILE FORMAT

BACKGROUND

Embedding and retrieving data in an application file format is an extensible process for storing data in a work file without the application needing to understand the content and/or the format of the data. In some situations, users have no way to move and/or access data from an external data source. For example, data may be stored in an online database and inaccessible while working offline. If manipulating the data comprises complex, multi-dimensional queries such as Online Analytical Processing (OLAP), large amounts of data may need to be stored and/or managed separately from other working data. This conventional strategy may cause problems as the management of separate data files may cause distribution and synchronization issues, especially if the data is part of a collaboration project. Furthermore, some users may not have the skills or experience to create multi-dimensional objects on their own, and may wish to use familiar applications for sharing and manipulating such objects rather than relying on other users with the necessary skills to create them.

SUMMARY

Embedding and retrieving data in an application file format may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Third party data embedding may be provided. Data associated with a third party provider may be saved in a native application save file. If a save file opened by the application is determined to comprise third party data, the application may determine whether an appropriate data provider is available. The application may connect to the data provider and provide on-demand access to the third party data upon request from a user and/or another program.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
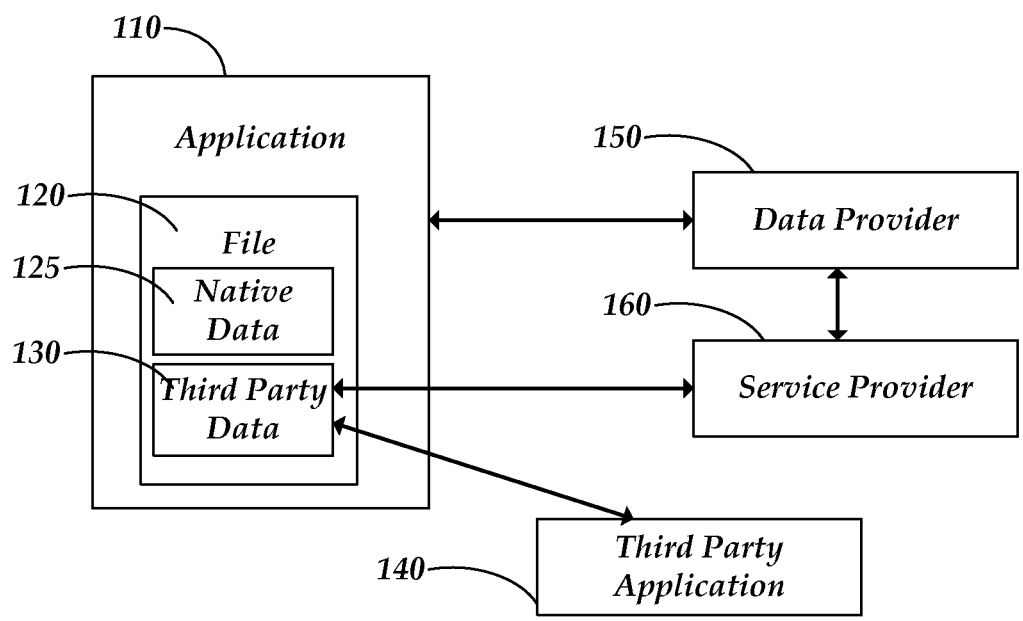
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Embedding of third party data in an application file may be provided. Software applications may use a native file format for saving data. For some applications, the native file format may not support types and/or amounts of data that a user may wish to view, edit, and/or modify within the application. For example, a spreadsheet application may be limited to storing up to one million rows of data in a single workbook save file, but a user may wish to interact with a database comprising tens of millions of data rows. The user may also wish to perform operations on the data that is not available within the application, such as producing reports based on an Online Analytical Processing (OLAP) cube within the spreadsheet application. A data provider such as an Object Linking and Embedding Database (OLEDB) interface may connect with the application to provide this interaction functionality.

Consistent with embodiments of the invention, the application may access a data provider that may provide support for loading and manipulating the third party data. The application may create a segment within its save file and allow the data provider to write its data directly to the segment of the save file. The file may be shared between different instances of the application, such as a second installation of the spreadsheet application on another user's computer, and opened as a native application file. On opening the file comprising the third party data, the application may determine whether a data provider is available to handle the data and use the data provider to allow access to the third party data, immediately and/or upon a user's attempt to access the data.

Further consistent with embodiments of the invention, the third party data may not be loaded until the user requests access to it. For example, the spreadsheet workbook may comprise a graph created using the third party data. The graph may be displayed as a picture to the user without needing to access the referenced third party data. If the user tries to modify the graph, the application may then utilize the data provider to load the third party data into memory and display the data to the user for interaction. This data loading may be performed asynchronously; that is, the user may be able to continue interacting with the application while the data provider is loading the third party data.

The ability to store third party data in the application file may enable users to store third party data without the application having to understand the format or contents of the data. Because the data is stored within the application file, that file may be distributed and used like any other application file, without losing the custom data and without needing a network connection to access that data. Application files containing custom third party data may remain responsive because they may be loaded on demand and asynchronously.

FIG. 1 is a block diagram of an operating environment 100 for embedding and retrieving data in an application file format. Operating environment 100 may comprise an application 110 associated with a save file 120. Save file 120 may comprise a native format associated with application 100 and/or a standard file format associated with a plurality of applications. For example, the Office Open XML standard is a file format for representing application data such as spreadsheets, charts, presentations, and word processing documents. The Open XML standard has been propagated as International Standard specification ISO/IEC 29500:2008. Save file 120 may comprise a plurality of segments, such as a native application data segment 125 and a third party data segment 130. Segments may further comprise divisions based on data type, such as an XML data segment. Consistent with embodiments of the invention, save file 120 may comprise a single file divided into segments for storing the both native and third party data and/or a compressed archive including a primary index file and a plurality of sub files. Consistent with embodiments of the invention, the primary index file may comprise links and/or location indices for any and/or all of the sub files.

Operating environment 100 may further comprise a third party application 140, a data provider 150, and a service provider 160. Third party application 140 may comprise, for example, a data manipulation application operative to create and/or manage a data cube, such as an OLAP cube. Data provider 150 may comprise an application and/or utility that may read, process, and/or translate data associated with third party application 140 and service provider 160 may comprise additional functionality available to operating environment 100. For example, data provider 150 may comprise an OLEDB provider operative to read the OLAP cube and forward data and/or queries to a database engine comprising service provider 160. Data provider 150 may also provide data to application 110, such as by providing the OLAP cube data to a spreadsheet application for viewing, modification, and/or other interactions. A user may thus exploit data provider 150 to leverage the data format of third party application 140 and the functional capabilities of application 110. To the user, the third party data may appear as a normal data file of the native type associated with application 110. When application 110 opens a file comprising third party data, application 110 may provide data provider 150 with a Uniform Resource Locator (URL) of the file. Data provider 150 may forward this URL to service provider 160 that may open the native file, extract the third party data, and provide the third party data to application 110. Consistent with embodiments of the invention, application 110 may open a file in its native format and detect the presence of third party data. Application 110 may then pass a pointer to the third party data to data provider 150 via a generic interface; that is, application 110 may use the same interface regardless of the format or destination provider associated with the third party data. Data provider 150 may forward the third party data to service provider 160 that knows how to read the third party data using the generic interface. Service provider 160 may then extract the third party data and return it to application 110 for display.

Figure 2:
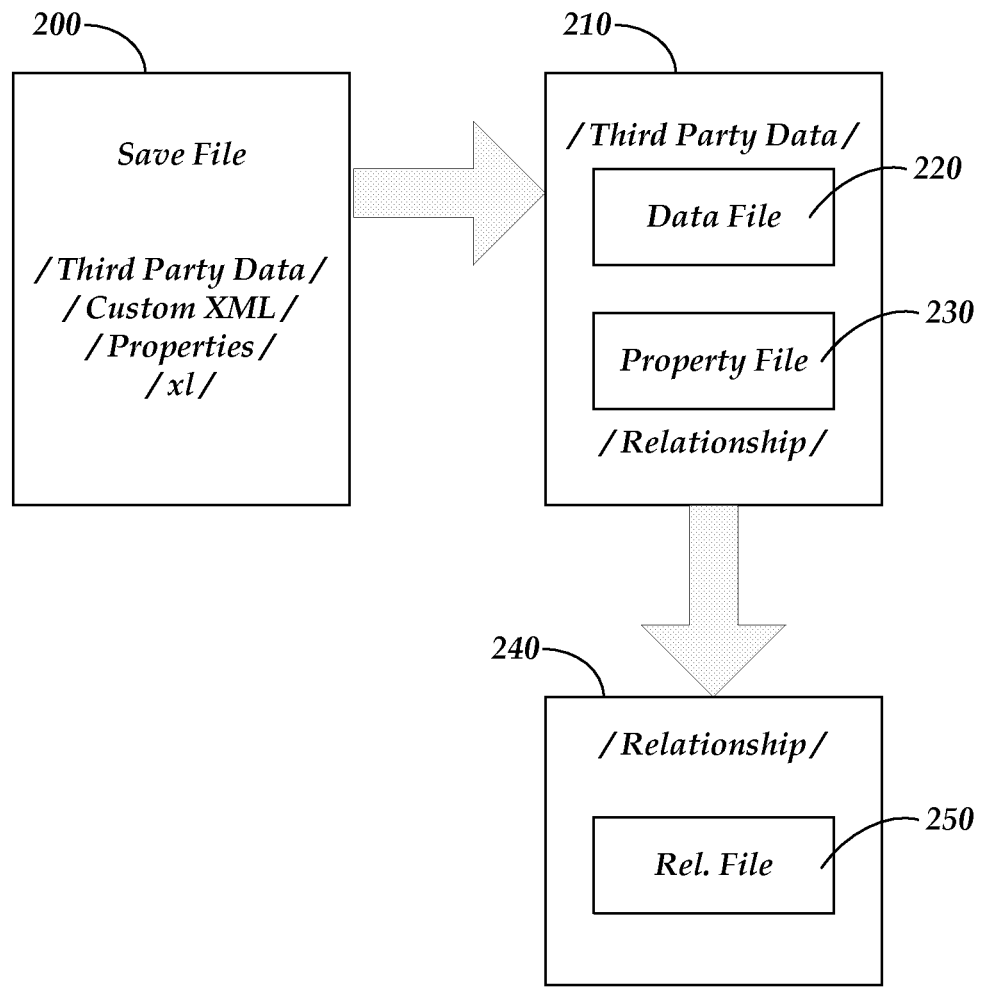
FIG. 2 is a block diagram illustrating a save file.

FIG. 2 is a block diagram illustrating a save file 200 consistent with embodiments of the invention. Other embodiments may comprise other formats, such as a single file comprising a segment for storing the third party data. Save file 200 may comprise a third party data folder 210 for storing third party data. Third party data folder 210 may comprise two associated files: a data file 220 and a property file 230. Third party data folder 210 may further comprise additional data files and companion property files (not shown). Data file 220 may comprise the actual data for third party data 130 and property file 230 may comprise properties associated with third party data 130. Third party data folder 210 may further comprise a relationship folder 240 comprising a relationship file 250 associated with data file 220. Relationship file 250 may specify the relationship between data file 220 and property file 230.

The format of the data in data file 220 may not be understood by application 110. When application 110 reads and writes data file 220, it may treat the contents as a chunk of data of a specified size. When application 110 opens a file containing a third party data segment, such as save file 200, application 110 may not load third party data 130 into memory immediately. Application 110 may only read and write to/from save file 220 when saving an unloaded third party data part to a new file.

Property file 230 may comprise a list of properties for associated data file 220. For example, property file 230 may comprise a unique identifier of the associated third party data part, a location for an associated data provider, and/or a list of alternative data providers able to process third party data 130. The unique identifier may comprise, for example, binary data, a uniform resource name (URN), a uniform resource locator (URL), a uniform resource identifier (URI), and/or a numeric and/or alphanumeric identifier string. This unique identifier may be created and/or managed by third party application 140 and/or data provider 150, and application 110 may use the unique identifier to determine which data file is being requested by data provider 150. The identifier may be specified by an identity attribute of an XML element and may be qualified by a namespace. An example of property file 230 may comprise the following XML:

```
<?xml version="1.0" encoding="UTF-8" standalone="no" ?>
<ds:datastoreItem ds:itemID="Microsoft.SqlServer.AnalysisServices.1"
xmlns:ds="http://schemas.openxmlformats.org/officeDocument/2006/customData
">
    <ds:schemaRefs />
</ds:datastoreItem>
```

Relationship file 240 may specifiy the relationship between data file 220 and property file 230. The <Relationship> element may specify a relationship id (the Id attribute); a relationship type (the Type attribute); and the data file that the corresponding property file applies to (the Target attribute). The following XML illustrates an example relationship file 240. In this example, relationship file 240 specifies that the property file applies to the item1.data file.

```
<?xml version="1.0" encoding="UTF-8" standalone="yes" ?>
<Relationships
xmlns="http://schemas.openxmlformats.org/package/2006/relationships">
    <Relationship Id="rId1"
    Type="http://schemas.openxmlformats.org/officeDocument/2006/relatio
    nships/customDataProps" Target="item1.data" />
</Relationships>
```

Save file 200 may comprise a connection string for aiding in connecting the third party data with service provider 160. Application 110 may not need to parse or understand the connection string, but may pass it to data provider 150 when required to do so. Third party application 140 may be responsible for properly creating the connection string and associating it with the third party data. When application 110 accesses an instance of data provider 150, it may query data provider 150 to determine whether it supports third party data. After establishing that data provider 150 supports the third party data, application 110 may pass, for example, a full file name and path of save file 200. Application 110 may then request the URN of the third party data from data provider 150, locate the data file of the specified third party data (i.e., data file 220), and create a read/write I/O stream for data file 220. For example, application 110 may supply data provider 150 with a persistent pointer through which data provider 150 may read from and write to the third party data.

Additionally, application 110 may supply data provider 150 with a location where data provider 150 may store temporary files. Application 110 may also pass a last modified date of save file 200 and/or a user security token needed to access save file 200. Application 110 may identify any third party data parts associated with save file 200 without interacting with data provider 150. This may allow application 110 to cope with a scenario where a relationship link to a third party data part may be deleted from save file 200 before application 110 connects to data provider 150. When there are no links referencing a third party data part, the data may be deleted from save file 200. A reference link may comprise an XML segment, such as the following, comprising a URN of third party data 130 to which the link refers.

```
<connection id="1"
emmbeddedDataId="Company.DBServer.ServiceProvider.1"
odcFile="c:\users\anyone\documents\my data sources\Example.odc"
keepAlive="1" name="Example" description="" type="5"
refreshedVersion="0"
new="1" background="1">
```

Application 110 may support connecting to data provider 150 asynchronously. For example, data provider 150 may load the custom, third party data during the connection phase. Connecting asynchronously may enable application 110 to remain responsive throughout the connection process and may enable the user to cancel the connection process if it is taking too long. Data provider 110 may also return values to application 110 that may indicate how much of the work data provider 110 has loaded and how much work it still has to do. This may enable application 110 to display a progress bar.

A user may use third party application 140 to create a third party data part. Third party application 140 may first create a connection between third party data 130 and service provider 160 and may configure a connection string comprising an identifier associated with data provider 150 and/or a URN associated with third party data 130. Application 110 may then try to connect to third party data 130 as if third party data 130 already exists. When the connection workflow reaches the point where application 110 tries to locate third party data 130 for a specified URN, application 110 may discover that third party data 130 does not exist in file 120. Application 110 may then create third party data folder 210 (if it does not already exist) and may create data file 220, property file 230 and relationship file 250 associated with third party data 130.

When application 110 saves file 120, it may save the data to a new file and then delete the original. During the save process, third party data 130 may not have been loaded; application 110 may copy third party data 130 to the new file without establishing a connection to data provider 150. For third party data parts that have been connected to, application 110 may check an attribute associated with a pointer to the connection stream to determine whether the data has changed. If so, application 110 may request data provider 150 to serialize the updated data into the new file.

If a user requests to delete the connection to third party data 130, application 110 may locate and delete all objects that are using the connection. Application 110 may further determine whether third party data 130 is associated with any other files used by application 110. If third party data 130 is not associated with any other files, application 110 may delete third party data 130 as well. Deleting third party data 130 may comprise deleting file 120 comprising third party data 130, deleting property file 230, and/or deleting relationship file 250. If there is no more third party data associated with file 120, then application 110 may also delete third party data folder 210.

Figure 3:
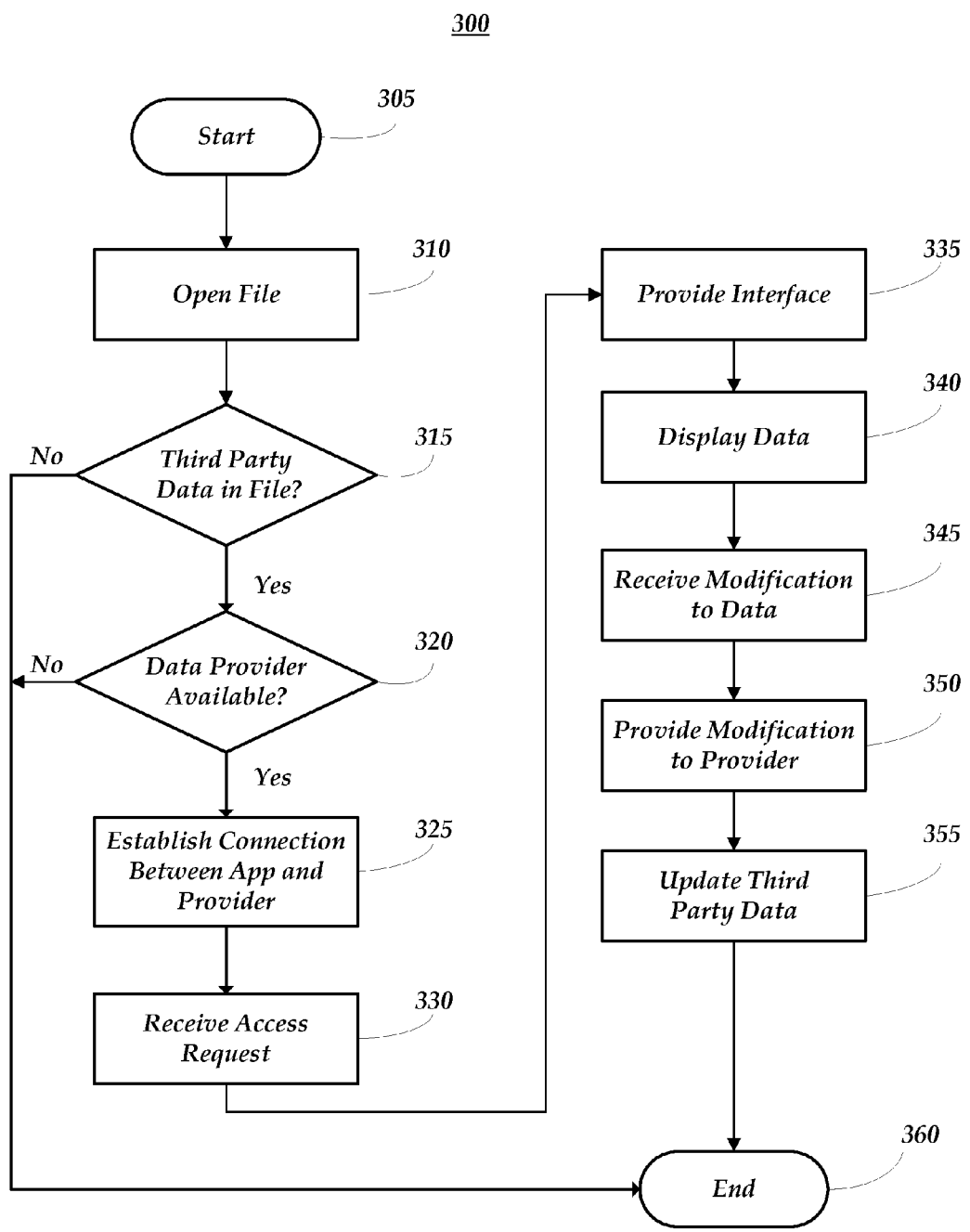
FIG. 3 is a flow chart of a method for providing access to third party data.

FIG. 3 is a flow chart setting forth the general stages involved in a method 300 consistent with an embodiment of the invention for embedding and retrieving third party data in an application's native file format. Method 300 may be implemented using a computing device 400 as described in more detail below with respect to FIG. 4. Ways to implement the stages of method 300 will be described in greater detail below. Method 300 may begin at starting block 305 and proceed to stage 310 where computing device 400 may open a file associated with an application. For example, a spreadsheet application may open a workbook file.

From stage 310, method 300 may advance to stage 315 where computing device 400 may determine whether the file comprises at least one third party data segment. For example, the third party data segment may comprise an OLAP cube stored as binary data.

If, at stage 315, computing device 400 determines that the file does not comprise a third party data segment, method 300 may end at stage 360 and computing device 400 may open the native application file as normal. Otherwise, method 300 may advance to stage 320 where computing device 400 may determine whether a data provider associated with the third party data segment is available. For example, if the file is opened on the same computer, then the same data provider used to store the third party data is likely to be available, but if the file is transferred to another computer, the data provider associated with the third party data may not be available. Consistent with embodiments of the invention, property file 230 may identify the data provider that originally stored the third party data and/or other data providers that may be able to interface with the third party data.

If, at stage 320, computing device 400 determines that no data provider is available, method 300 may end at stage 360 and computing device 400 may open the native application file as normal. Otherwise, method 300 may advance to stage 325 where computing device 400 may establish a connection between the application and the data provider. For example, application 110 may connect to data provider 150 according to a connection string stored in data file 220 and/or property file 230. Application 110 may also provide a security token, if needed, to data provider 150.

From stage 325, method 300 may advance to stage 330 where computing device 400 may receive a request from a user to access at least one third party data segment. For example, the user may attempt to interact with third party data displayed in application 110, such as modifying a chart based on the third party data.

From stage 330, method 300 may advance to stage 335 where computing device 400 may open a file stream interface to data provider 150 allowing data provider 150 to read and/or write to a save file location associated with application 110. This may allow data provider to read the third party data and may allow application 110 to interoperate with the third party data. Data provider 150 may expose the third party data to application 110 using a data interface supported by application 110.

Method 300 may then advance to stage 340 where computing device 400 bmay display the third party data. For example, application 110 may receive the data from data provider 150 and display it to the user. Method 300 may then advance to stage 345 where computing device 400 may receive a modification to the third party data from the user. For example, a user may update business insight data received from third party application 140 and use it to create and/or update a chart using functionality associated with application 110.

From stage 345, method 300 may advance to stage 350 where computing device 400 may provide the data modification to the data provider. For example, application 110 may save the file comprising the third party data and may inform data provider 150 that the data has changed and needs to be saved. Method 300 may then advance to stage 355 where computing device 400 may update the third party data segment stored in the file. For example, data provider 150 may use the file stream interface to write the updated data to a segment of the save file associated with application 110. Consistent with embodiments of the invention, if the third party data has not been changed, method 300 may skip stage 355. Method 300 may then end at stage 360.

An embodiment consistent with the invention may comprise a system for embedding data in a native application file. The system may comprise a memory storage and a processing unit coupled to the memory storage. The processing unit may be operative to establish a connection interface between an application and a data provider allowing the data provider to write data to the application. The processing unit may be further operative to receive data from the data provider and store the data in a file associated with a native format of the application. The data may be collected, by the data provider and/or a third party application, from a plurality of sources such as multiple databases, servers, or other application data. The processor may be further operative to expose the third party data to a user, receive modifications to the data, and save the modifications via the data provider.

Another embodiment consistent with the invention may comprise a system for accessing third party data in an application file. The system may comprise a memory storage and a processing unit coupled to the memory storage. The processing unit may be operative to open a file comprising a third party data segment associated with an application, determine whether a data provider associated with the third party data segment is available, and establish a connection between the application and the data provider. The file may comprise a primary index file comprising a location index, such as a URN, identifying a sub-file comprising the third party data segment. The processing unit may be further operative to provide a write-access interface to the data provider allowing the data provider to write data to the file associated with the application. Consistent with embodiments of the invention, the data provider may be operative to connect with and provide data interactions with a plurality of other applications.

Yet another embodiment consistent with the invention may comprise a system for providing access to third party data. The system may comprise a memory storage and a processing unit coupled to the memory storage. The processing unit may be operative to open a file associated with an application, determine whether the file comprises a third party data segment, determine whether a data provider associated with the at least one third party data segment is available, and establish a connection between the application and the data provider. The processing unit may be further operative to receive a request from a user to access the third party data segment, provide a read-write interface between the file and the data provider, and display at least a portion of the third party data segment as defined by the data provider. The processing unit may then be operative to receive a modification to the third party data segment from the user, provide the modification to the third party data segment to the data provider, and receive an update to the third party data segment stored in the file from the data provider.

Figure 4:
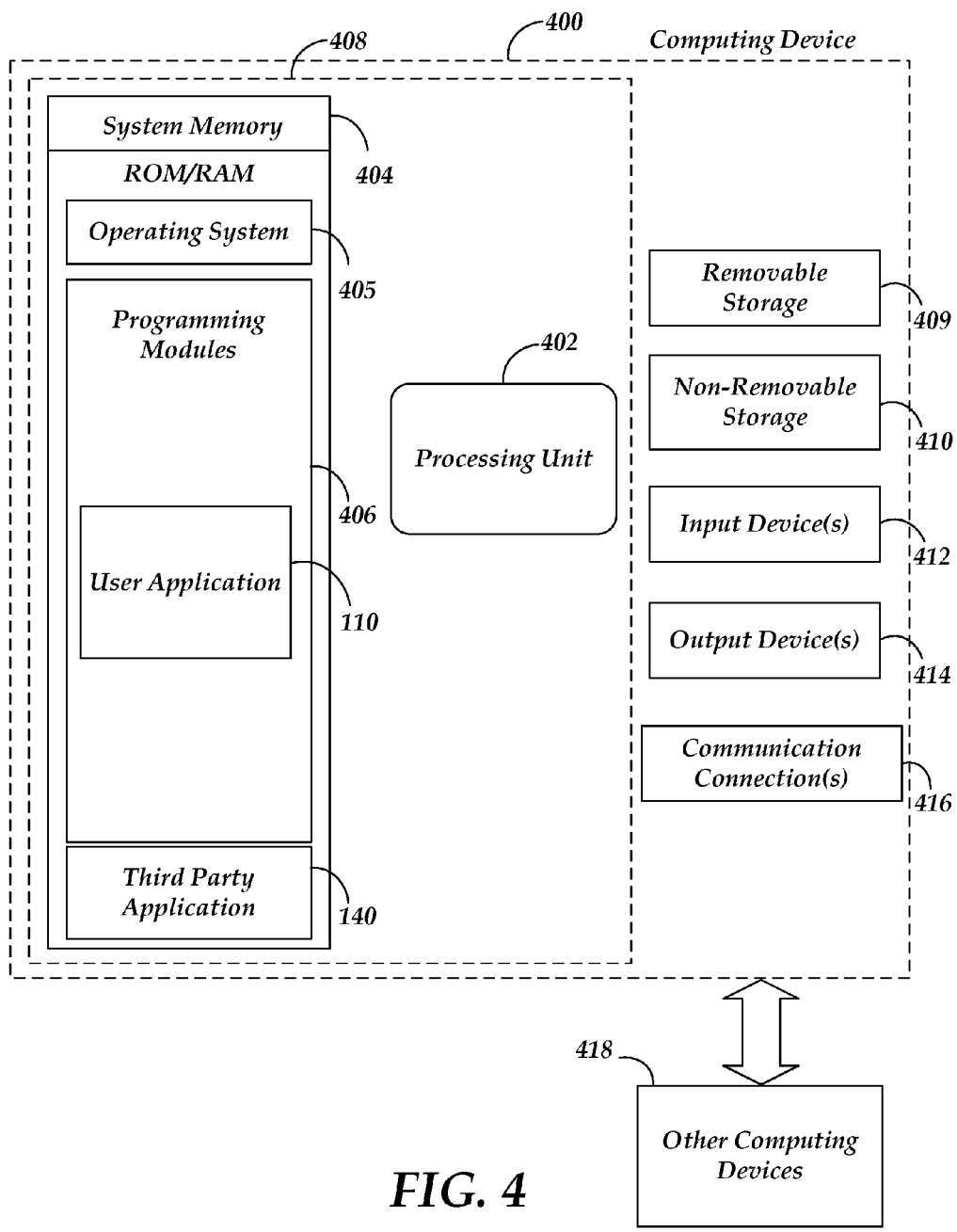
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise an operating environment for system 100 as described above. System 100 may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a user application 110. Operating system 405, for example, may be suitable for controlling computing device 400's operation. Programming modules 406 may include, for example, third party application 140 and/or data provider 150. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g. user application 110) may perform processes including, for example, one or more of method 300's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for embedding data in an application file, the method comprising:
    establishing a connection between an application and a data provider, wherein establishing the connection comprises providing a generic data interface for the data provider to read and write data to the application;
    receiving, through the generic data interface, a plurality of data from the data provider;
    storing the plurality of data in a file, wherein the file comprises a format associated with the application;
    modifying at least one element of the plurality of data within the application; and
    saving the modified at least one element to the file, wherein saving the modified at least one element comprises:
        providing the modified at least one element of the plurality of data to the data provider, and
        receiving a modification to the file associated with the modified at least one element of the plurality of data from the data provider via the generic data interface.

2. The method of claim 1, wherein the application does not comprise native support for retrieving the plurality of data.

3. The method of claim 1, wherein the data provider collects the plurality of data from a plurality of sources.

4. The method of claim 1, wherein the file comprises a compressed archive of a plurality of files, wherein at least one of the plurality of files comprises a primary index file, and wherein the primary index file comprises an entry for each of the other files of the plurality of files.

5. The method of claim 4, wherein storing the plurality of data in the file comprises storing the plurality of data in at least one of the other files of the plurality of files, and wherein the primary index file entry associated with the at least one of the other files of the plurality of files comprises an identifier associated with the data provider.

6. A computer-readable storage device which stores a set of instructions which when executed performs a method for accessing third party data in an application file, the method executed by the set of instructions comprising:
    opening a file associated with an application, wherein the file comprises a third party data segment;
    determining whether a data provider associated with the third party data segment is available;
    in response to determining that the data provider is available:
        establishing a connection between the application and the data provider, wherein establishing the connection comprises providing a generic data interface for the data provider to read and write data to the application,
        receiving, through the ,generic data interface, a plurality of data from the data provider,
        receiving a modification to at least one element of the plurality of data from the application, and
        saving the modified at least one element to the file, wherein saving the modified at least one element comprises:
            providing the modified at least one element of the plurality of data to the data provider, and
            receiving a modification to the file associated with the modified at least one element of the plurality of data from the data provider via the ,generic data interface.

7. The computer-readable storage device of claim 6, wherein the file comprise an Open XML file.

8. The non-transitory computer-readable of claim 6, wherein the third party data segment comprises binary data.

9. The computer-readable storage device of claim 6, wherein the file associated with the application comprises a location index for a sub-file, and wherein the third party data segment is stored in the sub-file.

10. The computer-readable storage device of claim 9, further comprising:
    receiving a user request to access the third party data segment within the application;
    providing the location index of the sub-file to the data provider; and
    providing the user access to the third party data segment through the data provider.

11. The computer-readable storage device of claim 6, further comprising providing the generic data interface as a read-write access interface to the data provider from the application, wherein the write-access interface is operative to allow the data provider to read and write data to the file associated with the application.

12. The computer-readable storage device of claim 6, further comprising:
    in response to determining that the data provider is not available, not loading the third party data segment into memory.

13. The computer-readable storage device of claim 6, wherein the third party data comprises a database table.

14. The computer-readable storage device of claim 13, wherein the data provider comprises a database engine.

15. The computer-readable storage device of claim 6, wherein the third party data comprises an OLAP cube.

16. The computer-readable storage device of claim 15, wherein the data provider comprises an OLEDB provider.

17. The computer-readable storage device of claim 6, wherein the data provider is operative to connect to a plurality of applications.

18. The computer-readable storage device of claim 6, wherein the connection between the application and the data provider comprises an asynchronous connection.

19. A system for providing access to third party data, the system comprising:
    a memory storage; and
    a processing unit coupled to the memory storage, wherein the processing unit is operative to:
        open a file associated with an application,
        determine whether the file comprises at least one third party data segment, wherein the at least one third party data segment comprises binary data,
        in response to determining that the file comprises the at least one third party data segment, determine whether a data provider associated with the at least one third party data segment is available,
        in response to determining that the data provider associated with the at least one third party data segment is available, establish a connection between the application and the data provider, wherein establishing the connection comprises providing a generic data interface for the data provider to read and write data to the application,
        receive a request from a user to access the at least one third party data segment, provide the generic data interface as a read-write interface between the file and the data provider,
display at least a portion of the at least one third party data segment as defined by the data provider,
receive a modification to the at least one third party data segment from the user,
provide the modification to the at least one third party data segment to the data provider, and
receive an update to the at least one third party data segment stored in the file from the data provider via the generic data interface, wherein the update comprises the modification received from the user.

\* \* \* \* \*